United States Patent
Mauro

(10) Patent No.: US 7,047,405 B2
(45) Date of Patent: May 16, 2006

(54) METHOD AND APPARATUS FOR PROVIDING SECURE PROCESSING AND DATA STORAGE FOR A WIRELESS COMMUNICATION DEVICE

(75) Inventor: Anthony Mauro, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 715 days.

(21) Appl. No.: 09/826,742

(22) Filed: Apr. 5, 2001

(65) Prior Publication Data

US 2002/0147920 A1 Oct. 10, 2002

(51) Int. Cl.
*H04L 9/00* (2006.01)
*H04K 1/00* (2006.01)

(52) U.S. Cl. .......................... 713/166; 705/64; 705/65; 705/66; 705/67; 705/68; 705/69; 705/76; 380/270; 380/272; 380/273; 380/275

(58) Field of Classification Search ................ 713/166; 705/76, 64, 65, 66, 67, 68, 69; 380/270, 380/272, 273, 275
See application file for complete search history.

(56) References Cited

U.S. PATENT DOCUMENTS

| | | | | |
|---|---|---|---|---|
| 4,881,271 A | * | 11/1989 | Yamauchi et al. | 455/436 |
| 5,224,160 A | | 6/1993 | Paulini et al. | 380/4 |
| 5,987,140 A | * | 11/1999 | Rowney et al. | 705/77 |
| 6,026,293 A | * | 2/2000 | Osborn | 455/411 |
| 6,084,968 A | | 7/2000 | Kennedy et al. | 380/259 |

FOREIGN PATENT DOCUMENTS

| | | |
|---|---|---|
| EP | 0849657 | 6/1998 |
| WO | 0117296 | 3/2001 |

OTHER PUBLICATIONS

Tasneem and Paul Brutch, Mutual Authentication, Confidentiality, and Key MANagement System for Mobile Computing and Wireless Communication, Computer Security Applications Conference, 1998, Proceedings., 14th Annual, Dec. 7-11, 1998 pp. 1-10.*

* cited by examiner

*Primary Examiner*—Matthew Smithers
*Assistant Examiner*—Courtney Fields
(74) *Attorney, Agent, or Firm*—Philip Wadsworth; Bruce W. Greenhaus; Andrea L. Mays

(57) ABSTRACT

Techniques for providing secure processing and data storage for a wireless communication device. In one specific design, a remote terminal includes a data processing unit, a main processor, and a secure unit. The data processing unit processes data for a communication over a wireless link. The main processor provides control for the remote terminal. The secure unit includes a secure processor that performs the secure processing for the remote terminal (e.g., using public-key cryptography) and a memory that provides secure storage of data (e.g., electronics funds, personal data, certificates, and so on). The secure processor may include an embedded ROM that stores program instructions and parameters used for the secure processing. For enhanced security, the secure processor and memory may be implemented within a single integrated circuit. Messaging and data may be exchanged with the secure unit via a single entry point provided by a bus.

26 Claims, 9 Drawing Sheets

METHOD AND APPARATUS FOR PROVIDING SECURE PROCESSING AND DATA STORAGE FOR A WIRELESS COMMUNICATION DEVICE

BACKGROUND

1. Field

The present invention relates generally to data communication, and more specifically to techniques for providing secure processing and data storage for a wireless communication device.

2. Background

Wireless communication systems are widely deployed to provide various types of communication. These systems may be based on code division multiple access (CDMA), time division multiple access (TDMA), or some other modulation techniques. CDMA systems may provide certain advantages over other types of system, including increased system capacity.

Conventional wireless communication systems are typically designed to provide voice and packet data services. For these services, the data to be transmitted is processed (e.g., encoded, covered, and spread) and conditioned (e.g., amplified, filtered, and upconverted) to generate a modulated signal suitable for transmission over the wireless link. To provide a level of security for the transmission and deter eavesdropping, the data is also typically scrambled with a specific long pseudo-noise (PN) sequence assigned to the user terminal originating or receiving the transmission.

With the explosive growth of computer networks, such as the Internet, a user with a remote terminal is able to excess data and services from a large number of entities (e.g., websites). Via the wireless link and computer network, the remote terminal is able to retrieve and send data, purchase goods and services, and perform other transactions. For many applications, security is not necessary and data may be transmitted in the clear (i.e., without encryption). However, for certain other applications, "sensitive" data may be exchanged. Examples of such sensitive data include personal information, credit card information, account information, and so on. For applications involving sensitive data, the scrambling with the long PN sequence only provides limited protection over the wireless portion of the transmission. This scrambling typically does not provide sufficient security for the communication.

For certain secure transactions, it is important to ascertain the true identities of the entities (e.g., the remote terminal) taking part in the transaction. Conventionally, a cellular system identifies a remote terminal by its mobile identification number (MIN) and electronic serial number (ESN). A shortcoming of this identification process is that the MIN/ESN is transmitted over-the-air on unsecured control channels. These channels may be easily monitored to obtain MIN/ESN information of active remote terminals. Once the MIN/ESN is known, it can be used to reprogram another remote terminal into a fraudulent clone of the original (legal) unit. Thus, the MIN/ESN is not sufficiently secure to be used for authentication of the remote terminal.

There is therefore a need in the art for techniques capable of supporting secure transaction for a wireless communication device.

SUMMARY

Aspects of the invention provide techniques for providing secure processing and data storage for a wireless communication device. The secure processing and data storage can be achieved in various manners based on various designs and employing various cryptographic techniques. In one design, security can be achieved by designating a secure unit to perform all secure processing and to store all sensitive data.

A specific embodiment of the invention provides a remote terminal in a wireless communication system capable of providing secure processing and data storage. The remote terminal includes a data processing unit, a main processor, and a secure unit. The data processing unit processes data for a communication over a wireless link. The main processor provides control for the remote terminal (e.g., control of the data processing unit). The secure unit includes a secure processor that performs the secure processing for the remote terminal and a memory that provides secure storage of data (e.g., electronics funds, personal data, certificates used for authentication, and so on).

The secure processor can be designed to include an (embedded) read only memory (ROM) that stores program instructions and parameters used for the secure processing. For enhanced security, the secure processor and memory can be implemented within a single integrated circuit (IC), which may also include the main processor. Messaging and data may be exchanged with the secure unit via a single entry point provided by a bus.

The secure unit can be designed to implement public-key cryptography for the secure processing. In this case, the private and public keys used for the secure processing may be generated based on various schemes and stored within the secure unit in various manners, as described below.

The secure processor may be designed with the capability to implement one or more security protocols such as, for example, the Secure Sockets Layer (SSL) protocol, Transport Layer Security (TLS) protocol, Internet Protocol Security (IPSec), and Wireless Application Protocol (WAP). For each secure transaction with a foreign entity, the secure unit can be configured to act in a role of a client or a server.

The invention further provides methods, apparatus, and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
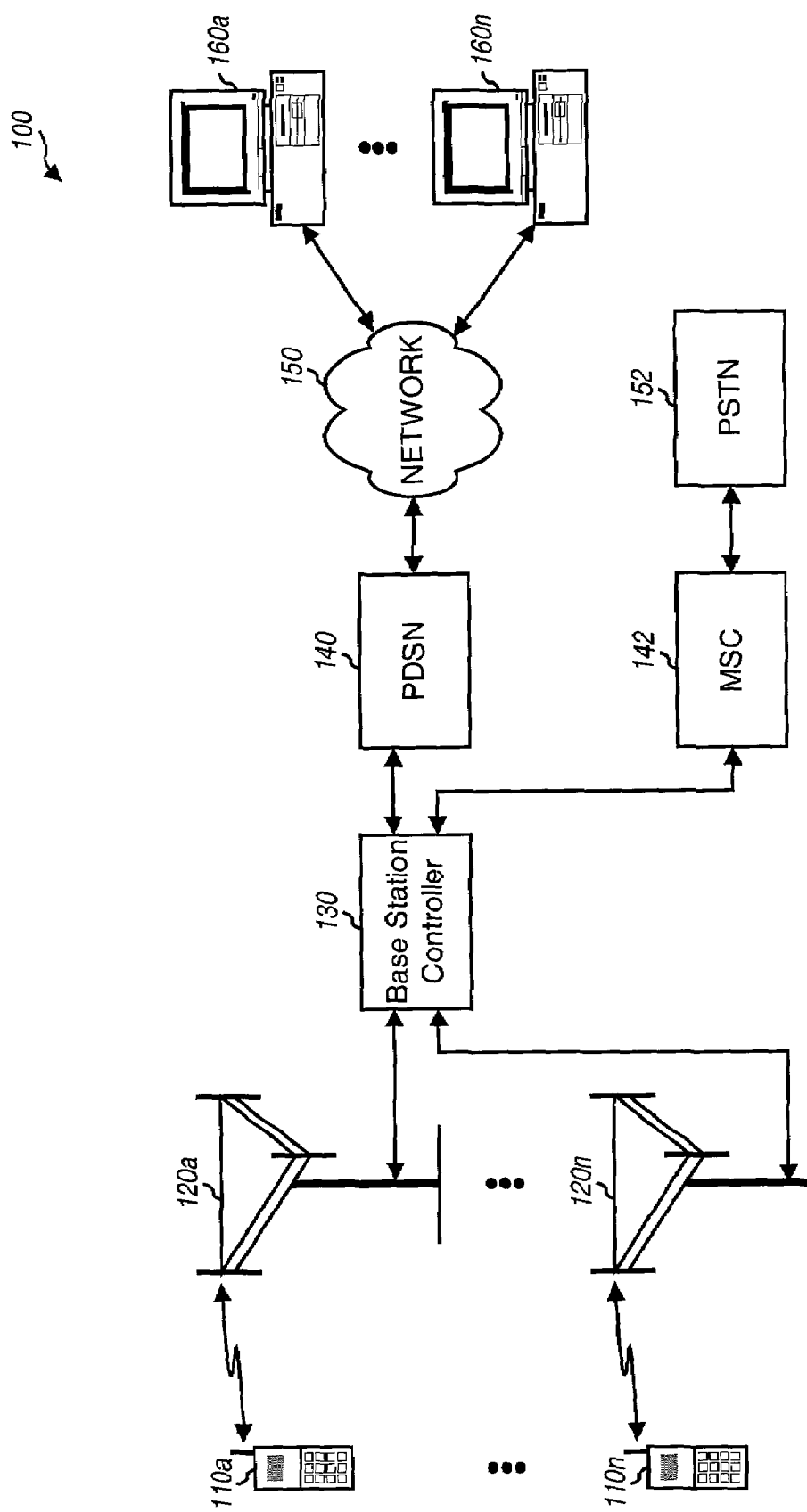
FIG. 1 is a block diagram of a system capable of supporting secure communication via a wireless link, in accordance with certain aspects of the invention.

FIG. 1 is a block diagram of a system 100 capable of supporting secure communication via a wireless link, in accordance with certain aspects of the invention. In system 100, each remote terminal 110 may communicate with one or more base stations 120 over a wireless link at any particular moment, depending on whether or not the remote terminal is active and whether or not it is in soft handoff. Each base station 120 couples to and communicates with a base station controller (BSC) 130, which provides coordination and control for the base station. BSC 130 controls the routing of calls for remote terminals in communication with the base stations coupled to the BSC.

For data services, BSC 130 further couples to a packet data serving node (PDSN) 140, which performs various functions to support packet data service. PDSN 140 further couples to a network 150 (e.g., an Internet Protocol (IP) network such as the Internet) that further couples to a number of servers 160. Each server 160 may be operated to provide data and/or services.

For voice services, BSC 130 further couples a mobile switching center (MSC) 142 that further couples to a public switched telephone network (PSTN) 152. MSC 142 controls, via BSC130 and base stations 120, the routing of telephone calls between remote terminals 110 and users coupled to PSTN 152 (e.g., conventional telephones).

The wireless portion of system 100 can be designed to support one or more CDMA standards such as the IS-95, IS-98, cdma2000, W-CDMA, or some other CDMA standard, or a combination thereof. These CDMA standards are known in the art and incorporated herein by reference.

Figure 2:
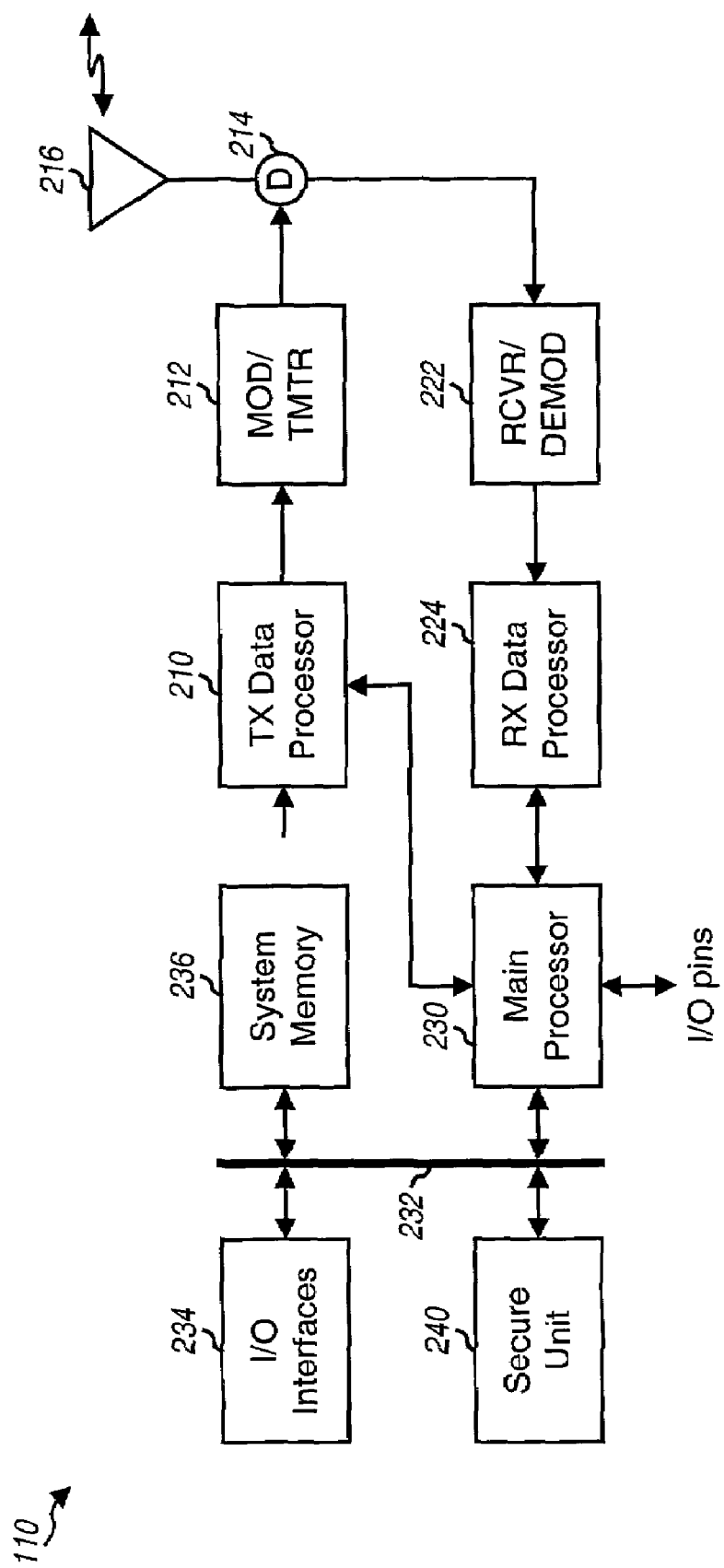
FIG. 2 is a block diagram of an embodiment of a remote terminal capable of implementing various aspects of the invention.

FIG. 2 is a block diagram of an embodiment of remote terminal 110, which is capable of implementing various aspects of the invention. Remote terminal 110 includes a data processing unit used to process data for communication over the forward and reverse links with one or more base stations, a main processor used to provide control for the remote terminal, and a secure unit used to provide secure processing and data storage.

For the reverse link, data is provided (typically in blocks or packets) from a data source (e.g., a system memory 236) to a transmit (TX) data processor 210, which formats and encodes the data to provided encoded data. A modulator/transmitter unit (MOD/TMTR) 212 receives and further processes (e.g., covers, spreads, scrambles, filters, amplifies, modulates, and upconverts) the encoded data to generate a modulated signal suitable for transmission over the wireless link. The modulated signal is routed through a duplexer 214 and transmitted via an antenna 216 to one or more base stations 120. The encoding and processing at remote terminal 110 are dependent on the CDMA standard or system being implemented. The processing of the reverse link signal at a receiving base station is complementary to that performed at remote terminal 110.

For the forward link, the transmitted forward link signal from one or more base stations 120 is received by antenna 216, routed through duplexer 214, and provided to a receiver/demodulator (RCVR/DEMOD) 222. Within receiver/demodulator 222, the received signal is conditioned (e.g., amplified, filtered, downconverted, quadrature demodulated, and digitized) and further processed (e.g., descrambled, despread, and decoded) to provide symbols. A receive (RX) data processor 224 then decodes the symbols to recover the transmitted data, which is provided to a data sink (e.g., system memory 236). The processing and decoding for the forward link signal are performed complementary to the processing and coding performed at the transmitting base station.

In the embodiment shown in FIG. 2, remote terminal 110 further includes a main processor 230 acting as the central processing unit for the remote terminal. Main processor 230 performs various processing functions and further coordinates and controls the operations of various elements within remote terminal 110 to achieve the desired functionality. For example, main processor 230 typically directs the operation of TX and RX data processors 210 and 224 to process data for the reverse and forward links, respectively.

Main processor 230 further couples to a bus 232 that interconnects a number of other elements such as input/output (I/O) interfaces 234, system memory 236, and a secure unit 240. I/O interfaces 234 provide interface with the user and may comprise a keypad, a display unit, a speaker, a microphone, and possibly others. System memory 236 may comprise a random access memory (RAM) and a read only memory (ROM) used to store program instructions (e.g., for main processor 230) and data. Secure unit 240 performs secure processing and provides secure storage, as described in further detail below.

Main processor 230 can be designed to operate based on program instructions downloaded onto system memory 236 (e.g., onto a Flash memory that is part of memory 236). The download may be achieved via external I/O lines or over-the-air transmissions. Because of its easy accessibility, main processor 230 is vulnerable to attack from the external I/O lines as well as from over-the-air negotiation.

Secure processing and data storage can be achieved in various manners based on various designs and employing various cryptographic techniques. In one design, security can be achieved by designating secure unit 240 to perform all secure processing and to store all "sensitive" data. In general, sensitive data includes any data desired to be prevented from unauthorized access. In another design, security can be achieved by designating secure unit 240 to perform all secure processing (e.g., based on cryptographic keys stored within the secure unit) but the sensitive data can be made secure and stored outside secure unit 240 (e.g., in system memory 236). Some of these designs are described below, and others are also possible and within the scope of the invention.

Figure 3:
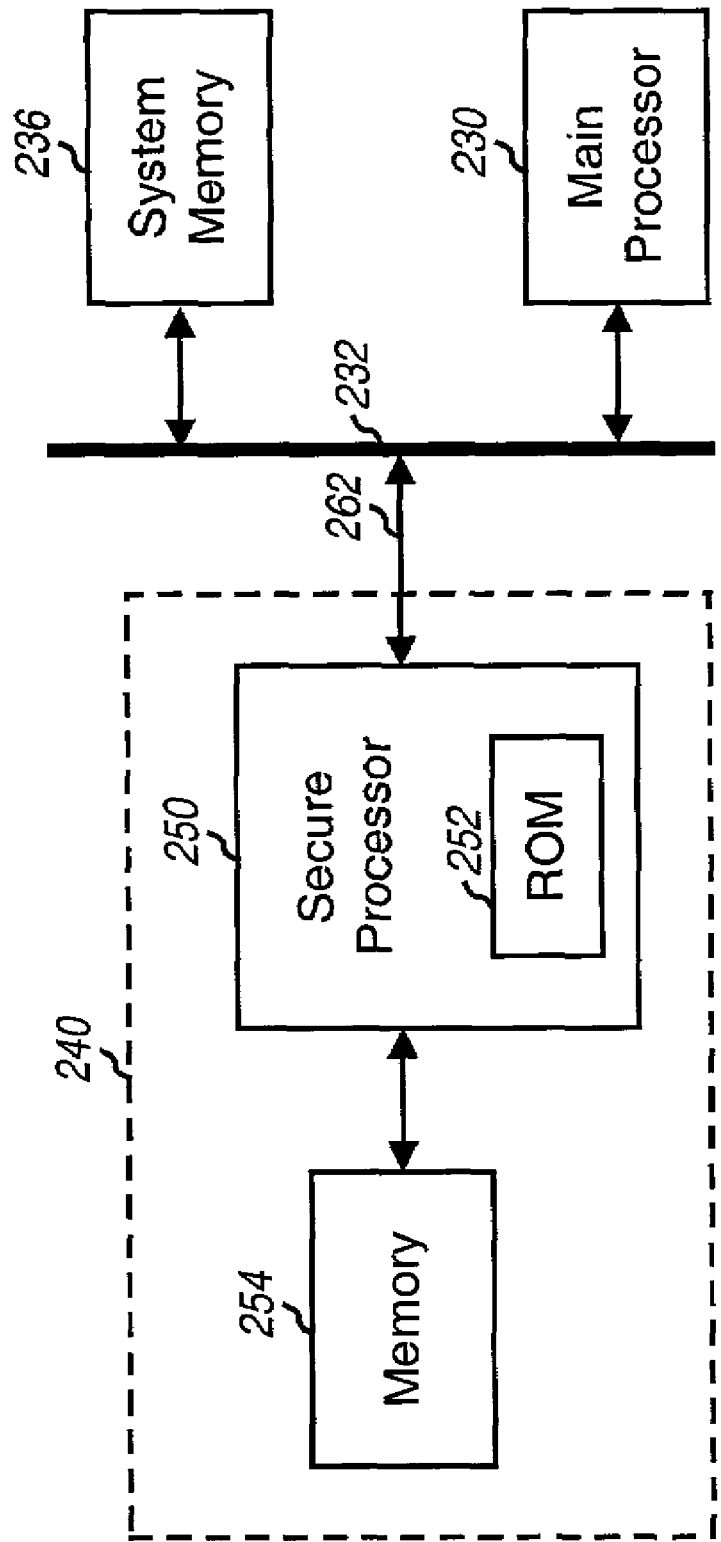
FIG. 3 is a diagram of a specific embodiment of a secure unit within the remote terminal.

FIG. 3 is a diagram of a specific embodiment of secure unit 240. In this embodiment, secure unit 240 effectively implements a secure digital "vault" that employs a secure processor 250 to access a non-volatile memory 254, which is isolated from other untrusted units (e.g., main processor 230). In an embodiment, to provide enhanced security, secure unit 240 interfaces with other elements within remote terminal 110 (e.g., main processor 230, system memory 236) via a single entry point provided by a bus 262 that couples directly to secure processor 250. This design ensures that all communication and data exchanges with secure unit 240 are channeled to a single trusted processor 250, which can be designated and designed to safeguard against security attacks and spoofing entities (e.g., hackers, viruses, and so on) that may attempt to infiltrate the secure unit in order to retrieve secure data.

Secure processor 250 is a trusted processing unit that performs secure processing for remote terminal 110. The secure processing may be achieved based on program instructions and parameter values (e.g., cryptographic keys) stored in a ROM 252. Secure processor 250 receives external messages and data via bus 262, authenticates and/or processes the received messages and data, and may store the data to memory 254. When required and as instructed, secure processor 250 retrieves data stored within memory 254, processes and/or encrypts the retrieved data, and may send the data to external elements (e.g., main processor 230) via bus 262.

Memory 254 is a non-volatile memory that may be used to store sensitive data and (possibly) program instructions. Because of its placement behind secure processor 250, memory 254 is physically separated from other unsecured elements, which do not have direct access to memory 254. Memory 254 may be battery backed, and may be implemented as a Flash memory.

In the embodiment shown in FIG. 3, ROM 252 is implemented within secure processor 250 and stores program instructions and secure parameters used to perform the secure processing. This design allows secure processor 250 to be operated without dependency on other external elements, since such dependency may compromise security. The program instructions and parameters may be loaded (or burned) into the ROM 252 via a secure operation (e.g., during the manufacturing phase) and become available for use thereafter.

Various mechanisms may be used to deter against unauthorized access of memory 254 (i.e., without first going through secure processor 250). In one embodiment, secure processor 250 and memory 254 are implemented within a single integrated circuit (IC). This allows memory 254 to be physically secure with secure processor 250 and prevents tampering of memory 254. The IC may or may not include other elements of remote terminal 110 (e.g., main processor 230). In another embodiment, secure processor 250 and memory 254 are implemented as two separate units enclosed within a secure and/or tamper resistance/evident unit. Other mechanisms to prevent and deter unauthorized access of memory 254 may also be implemented and are within the scope of the invention.

Secure unit 240 may be designed to implement a number of secure functions for remote terminal 110, which may in turn be used for various applications. These secure functions may include any combination of the following: authentication, encryption, data storage/manipulation, and possibly others. Authentication comprises the processing needed to verify the true identity of an entity, and is used to allow remote terminal 110 to verify the identity of a foreign entity (e.g., server 160) or to allow the foreign entity to verify the remote terminal's identity. Encryption comprises the processing to secure data such that unauthorized entities are not able to intercept and recover the data. Secure data storage/manipulation entails safeguarding sensitive data against unauthorized accesses, and updating the data only when and as appropriate. These secure functions are described in further detail below.

Various schemes may be used to implement authentication and/or encryption. One popular scheme is based on public-key cryptography, which uses a pair of keys—a private key and a pubic key. The private key is kept in secrecy and the public key is provided as needed (e.g., for authentication, encryption, or decryption). Secret keys may also be generated for a particular secure transaction based on the private key. The generation and management of keys are described in further detail below. Different secure functions (i.e., authentication or encryption, or both) may be achieved based on how the keys are used to process data.

Other schemes may also be used for authentication and/or encryption and are within the scope of the invention. For example, secret key cryptography based on DES (Data Encryption Standard) may also be used. For secret key cryptography (which is also referred to as symmetric encryption), both transacting entities know a secret key a priori and keep the key secret from others.

Figure 4A:
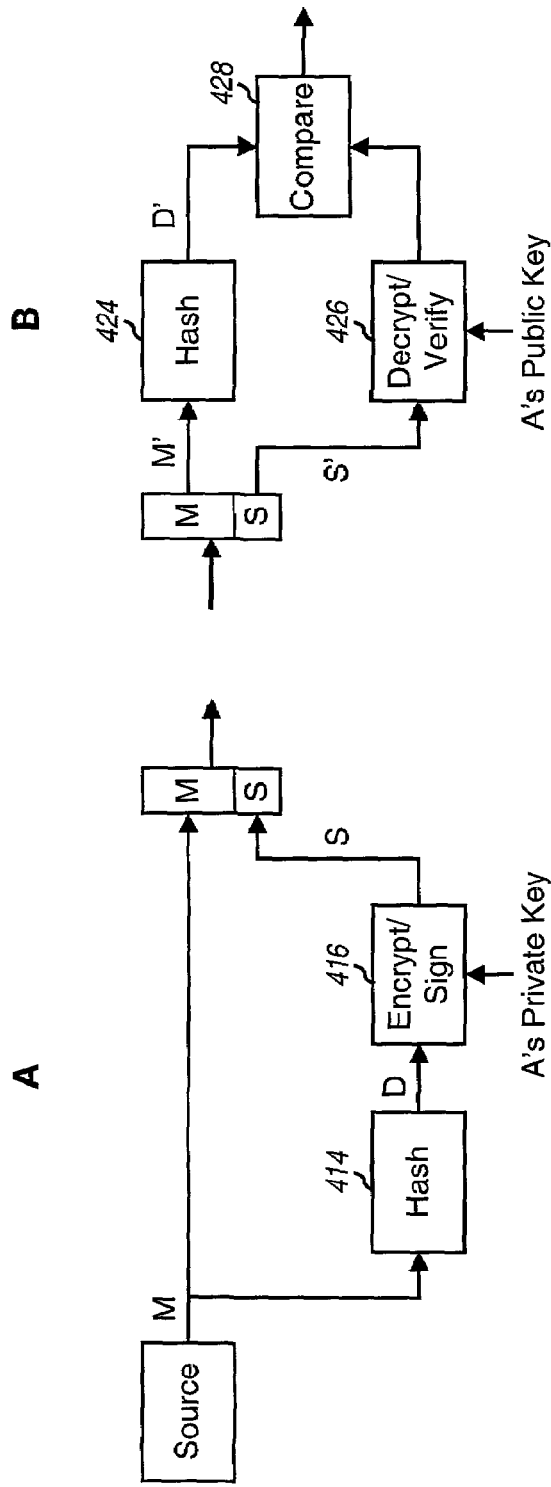
FIGS. 4A and 4B are simplified diagrams of the processing to authenticate and encrypt/decrypt a message, respectively.

FIG. 4A is a simplified diagram of the processing to authenticate a message. Authentication may be used by either remote terminal 110 or a foreign entity (e.g., server 160), or both, to verify that the source originating the message is what it claims to be. At the sending entity (A), a message (M) to be transmitted is hashed by a hash function (block 414) to provide a message digest (D). The hash function may be the SHA-1 (Secure Hash algorithm), MD-4 (Message Digest), MD-5, or some other hash algorithm known in the art.

The message digest is then either encrypted or signed (block 416) with the sending entity's private key to generate a signature (S). The encryption can be based on the RSA (Rivest, Shamir, and Adleman), Diffie-Hellman, DES (Data Encryption Standard), IDEA (International Data Encryption Algorithm), CAVE (Cellular Authentication and Voice Encryption, which is defined by IS-54), or some other encryption algorithm known in the art. The "signing" can be based on the DSA (Digital Signature Algorithm) defined in the DSS (Digital Signature Standard), or some other algorithm. The private key is kept secret and is only known to the sending entity. The message and signature are both transmitted to the receiving entity (B).

At the receiving entity, the transmitted message and signature are received, and the received message (M') is hashed (block 424) with the same hash function used at the sending entity to generate a recovered message digest (D'). The received signature (S') is also decrypted or processed/verified (block 426) with the sending entity's public key to generate a value. Depending on the algorithm used, the decryption/verification can be based on an algorithm that is the same or complementary to the one used at the sending entity. The generated value is compared to the recovered message digest (block 428), and the sending entity is authenticated if the two match.

Figure 4B:
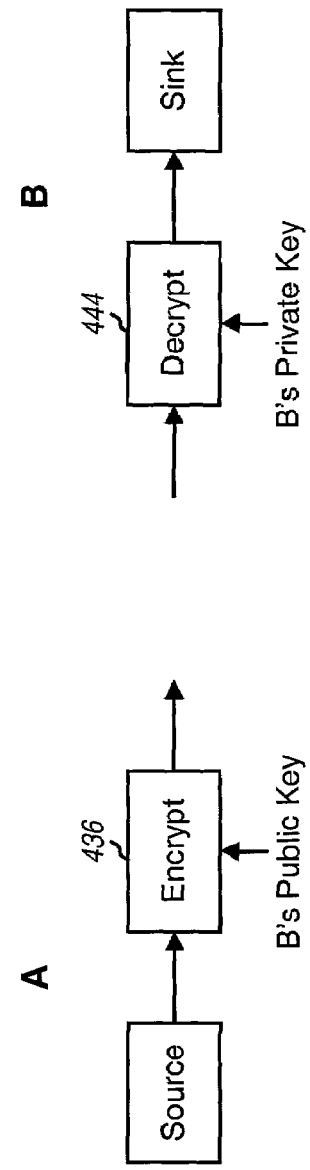

FIG. 4B is a simplified diagram of the processing to encrypt a message. Encryption may be used by either remote terminal 110 or a foreign entity, or both, to secure data prior to transmission. At the sending entity (A), a message (M) to be transmitted is encrypted (block 434) with the receiving entity's public key (or a secret key) to generate an encrypted message that only the receiving entity can recover. The encryption can be based on the RSA, Diffie-Hellman, DES, IDEA, or some other encryption algorithm. The encrypted message is transmitted to the receiving entity (B). The secret key may be generated for the communication (or transaction) based on the Diffie-Hellman or RSA algorithm.

At the receiving entity, the transmitted message is received and decrypted (block 444) with an algorithm that is the same or complementary to the one used at the sending entity. The decryption is performed with the receiving entity's private key (or the complementary secret key). Thus, only the receiving entity is able to recover the encrypted message since only it has the private key (or secret key) corresponding to the public key used to encrypt the message.

Based on the above descriptions for authentication and encryption, the generation and management of keys are important aspects of a secure system. For a public-key system, a private key and a public key are needed for the secure processing. These keys can be generated and provided to the remote terminal in a secure manner based on various schemes.

In one key management scheme, the private and public keys are generated for the remote terminal (e.g., by a certificate authority), and the private key is permanently stored in the remote terminal. The permanent storage may be achieved, for example, by etching the private key in a metal layer of secure processor 250 during the manufacturing process. This effectively "stamps" each remote terminal with its own permanent private key, which ensures that the private key is safe from theft, attack, and alteration.

In another scheme, the private and public keys are generated for the remote terminal, and the private key is loaded into the secure storage (e.g., ROM 252 or memory 254) within secure processor 250. The loading of the private key can be achieved in a secure environment e.g., during the manufacturing process or at a subsequent time if it is detected that security may have been compromised. For example, the private key may be stored to ROM 252 by blowing fuses (e.g., electronically or with a laser). This scheme may provide flexibility in updating the keys. Since the secure storage is inaccessible by external elements, the private key is safe.

In yet another scheme, the private and public keys are generated by secure processor 250, if requested or as directed. The keys may be generated entirely by the remote terminal, or may be generated based on parameters provided by an external source (e.g., a certificate authority). This scheme provides flexibility in updating the keys. The private key can be stored into the secure storage (e.g., ROM 252 or memory 254).

For the above schemes, the public key is typically also stored in the secure memory (e.g., stored in memory 254). The public key may thereafter be provided to other entities whenever needed. The public key may be certified by a trusted certificate authority and encapsulated in a certificate, which may be stored to the secure storage, as described below.

With public-key cryptography, entities can negotiate the keys used for performing the secure processing. In many instances (e.g., e-commerce) it is not practical to know the key beforehand. With public-key cryptography, the two transacting entities can used different private keys and exchange public keys or secret keys, as needed. Secret keys (e.g., for a particular transaction) may also be generated based on the Diffie-Hellman or RSA algorithm and exchanged as needed.

A public key may be encapsulated within a certificate, which may then be sent and used for authentication and/or encryption. Initially, the remote terminal is provided with a private key (e.g., based on any one of the techniques described above). A certificate, such as the one defined by ITU X.509, can be issued for the remote terminal. The certificate includes various types of information such as the remote terminal's public key, a signature, and the specific algorithm and parameters used to generate the signature. The certificate can be stored by the remote terminal and later used for authentication, which may be achieved based on various schemes.

In one authentication scheme, the certificate is issued and signed by a trusted certificate authority that certifies the remote terminal's identity. Authentication of the remote terminal may thereafter be achieved as follows. The remote terminal sends to a foreign entity (e.g., server 160) a message signed by the remote terminal along with the certificate, which includes the remote terminal's public key and a signature of the certificate authority. The foreign entity receives the remote terminal certificate, authenticates the signature of the certificate authority, and uses the remote terminal's public key to authenticate the signed message. The foreign entity is thus able to verify the identity of the remote terminal, as certified by the trusted certificate authority.

In another authentication scheme, the certificate is generated and signed by the remote terminal. Authentication of the remote terminal may thereafter be achieved as follows. The remote terminal sends to a foreign entity a message signed by the remote terminal along with the certificate, which includes the remote terminal's public key and the remote terminal's signature. The foreign entity receives the remote terminal certificate, authenticates the signature of the remote terminal, and uses the remote terminal's public key to authenticate the signed message. The foreign entity thus verifies the identity of the remote terminal as based on the remote terminal's signature.

Other schemes may also be used for authentication and are within the scope of the invention. Different levels of authentication may be achieved, for example, based on different uses of the certificate. The particular authentication scheme used for a secure transaction may be dependent on the type of transaction being performed.

Figure 5A:
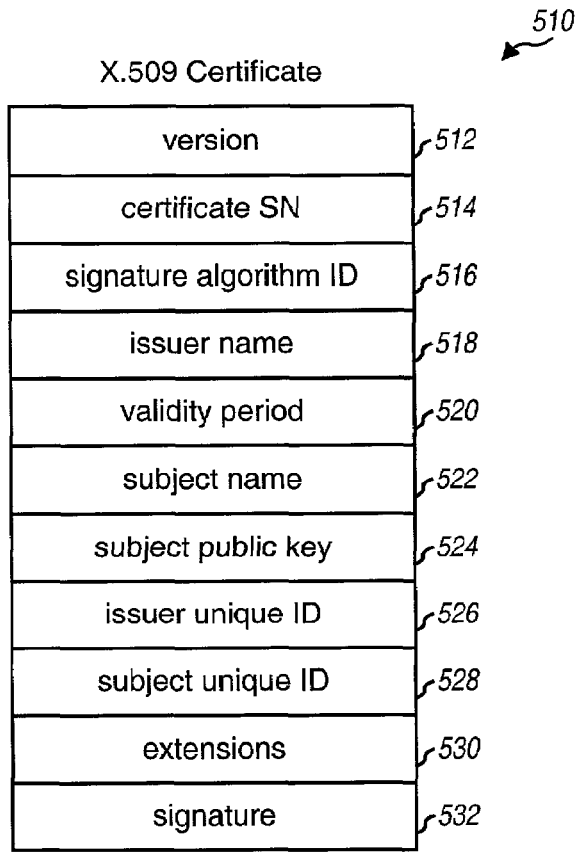
FIG. 5A is a diagram of an ITU X.509 certificate that may be used for authentication.

FIG. 5A is a diagram of an ITU X.509 certificate 510 that may be used to encapsulate a public key. Certificate 510 includes a number of fields used to provide various types of information related to the key. A version field 512 identifies the format of the certificate (e.g., X.509 version 3). A certificate serial number field 514 includes the specific serial number assigned to this certificate (by the issuer of the certificate, e.g., a certificate authority). A signature algorithm identification field 516 identifies the specific algorithm used by the issuer of the certificate to sign the certificate (e.g., MD-5 hash, RSA signature, or some other). This allows an entity receiving the certificate to process and authenticate the certificate. An issuer name field 518 identifies the specific trusted certificate authority (e.g., Verisign, Belsign, American Express, and so on), if any, which issues the certificate.

A validity period field 520 identifies the time period over which the certificate is valid. This period is typically determined by the issuer. A subject name field 522 includes the name of the entity (the "subject") for which the certificate was generated. A subject public key field 524 includes the public key of the subject (e.g., RSA, 0xabcdef, 0x12345). An issuer unique ID field 526 and a subject unique ID field 528 include the IDs assigned to the issuer and subject, respectively. Extensions field 530 may be used to include keys, policy information, attributes, constraints, and other pertinent information. And a signature field 532 includes a signature generated by hashing fields 512 through 530 and encrypting/signing the hash digest with the issuer's private key.

Figure 5B:
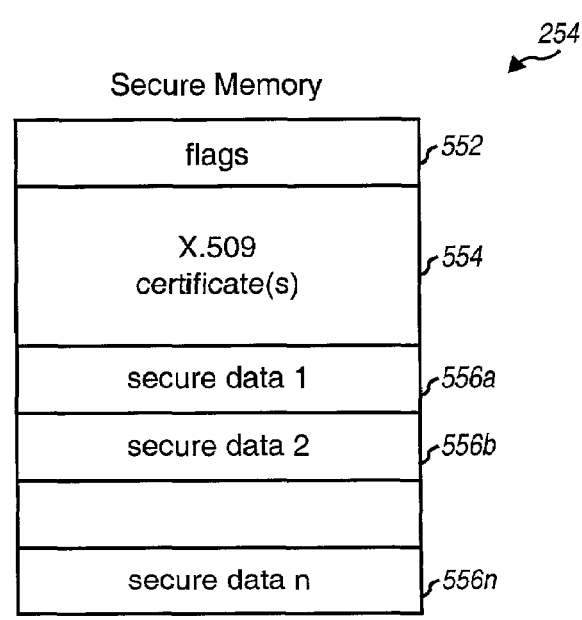
FIG. 5B is a diagram of a specific embodiment of a memory within the secure unit.

FIG. 5B is a diagram of a specific embodiment of memory 254. The implementation of memory 254 is typically dependent on the overall design of secure unit 240. Moreover, the types of data to be stored in memory 254 may be dependent on the scheme used for the secure processing. In the embodiment shown in FIG. 5B, memory 254 includes a flags field 552, a certificate field 554, and a number of data fields 556a through 556n. Additional and/or different fields may also be supported and are within the scope of the invention.

Flags field 552 includes one or more flags indicative of the state of memory 254 and/or the state of the stored data. The flags within field 552 allow secure unit 240 to keep track of approved memory accesses, parameter and data updates, alarms, and so on, as described below. For example, a flag may be provided to indicate whether or not a certificate is stored within memory 254. Certificate field 554 stores one or more certificates, which may be used to authenticate remote terminal 110 and/or other entities. Certificates are typically loaded into memory 254 via secure transactions (as described below), and typically include parameters (e.g., cryptographic keys) used to perform secure processing (as described above). Data fields 556 store sensitive data and possibly data needed for the operation of secure processor 250.

Various types of sensitive data may be stored within secure unit 240. Such sensitive data may comprise, for example, personal information, financial information (e.g., credit card number, electronic funds balance, account information, and so on), authentication information, and others. Some of these data types are described below. Generally, any data desired to be prevented from unauthorized accesses may be deemed as sensitive data and stored within secure unit 240.

Certificates. As a remote terminal (e.g., a cellular phone) becomes more of an e-commerce device, the need for it to act as a "server" inevitably arises. For example, before being entrusted with sensitive data or before a transaction can be initiated, the true identity of the remote terminal may need to be ascertained. In that case, the remote terminal is authenticated by and to the satisfaction of the foreign entity. This authentication may be achieved based on a certificate containing identity verification information for the remote terminal. If the remote terminal certificate is distributed from a trusted certificate authority and can be verified as such, then the remote terminal's identity can be authenticated, as verified by the certificate authority. The vault may be used to store one or more remote terminal certificates. For example, certificates for all members of a family or a team may be stored, with each member having individual "personal account" information stored with different pins to access.

Electronic Wallet. The remote terminal may serve as a "wallet" and store electronic currency in the secure digital vault (e.g., within memory 254). For example, a user may communicate with a bank and download funds into the vault. The funds may thereafter be used to purchase goods and services from stores or websites, to pay bills, or may be transferred to another device or entity. The user may also replenish the vault with additional funds as desired. For each transaction, the proper amount is deducted from or credited to the current balance. The transaction may be achieved via a wireless connection (e.g., via a bluetooth connection with a properly equipped cash register, over-the-air to a website, and so on).

Cryptographic Information. The remote terminal may store cryptographic parameters and keys used for the secure processing. These parameters may include, for example, those used for the CAVE algorithm defined by IS-54 to authenticate the remote terminal. The remote terminal may also be designed to store session keys used to support secure sessions with websites. The session keys may be provided at the start of a session and may be discarded at the end of the session. The remote terminal may further store cryptographic keys used for signing and verifying messages, for encrypting and decrypting data, and so on.

Figure 6A:
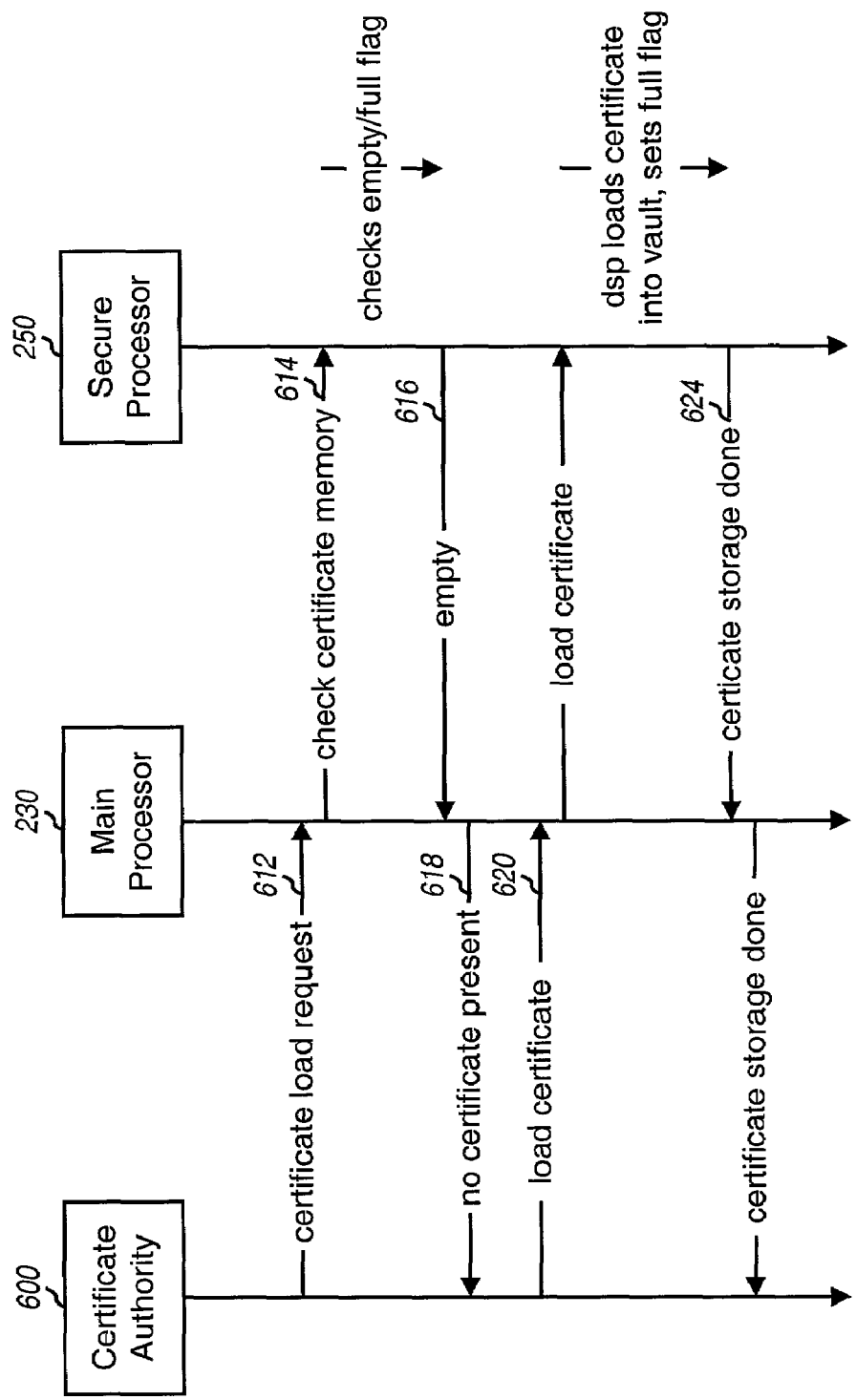
FIGS. 6A–6C are diagrams respectively illustrating an initial loading, a successful subsequent loading, and an unsuccessful subsequent loading of a certificate into the secure unit, in accordance with embodiments of the invention.

FIG. 6A is a diagram illustrating an initial loading of a certificate into secure unit 240, in accordance with an embodiment of the invention. In an embodiment, the level of security to be exercised for a certificate load is dependent on the status of the secure storage (e.g., memory 254). If the secure storage is empty (e.g., as indicated by a flag) a certificate may be loaded with reduced security checks. Otherwise, if the secure storage already contains a certificate, a more complex transaction involving more secure checks may be performed. The process shown in FIG. 6A may be used to load the private key for the remote terminal, if one is not already embedded in the secure processor. The process may also be used to load the primary and secondary users certificates into memory 254.

The certificate includes the remote terminal's public key. Depending on the particular scheme used, the certificate authority may (1) generate the remote terminal's private and public keys and provide them to the remote terminal, or (2) be provided with the public key generated by the remote terminal. The public key is then encapsulated into a certificate such as the one shown in FIG. 5A. If the encapsulation is performed by the certificate authority, the certificate authority's signature is included in the certificate and attests to the verification of the remote terminal and the validity of the public key by the certificate authority.

The initial certificate loading may be performed during the manufacturing process or at a subsequent time. As shown in FIG. 6A, the certificate is loaded via a transaction between a trusted certificate authority 600 and secure processor 250, via main processor 230. Initially, certificate authority 600 sends a message 612 requesting a certificate load. Main processor 230 receives and processes the message and, in response, sends a request 614 to check the status of the secure storage (e.g., memory 254). Secure processor 250 receives the request and determines the status of the secure storage, e.g., by checking a particular flag that indicates whether the certificate field in the memory is full or empty. If the secure storage is empty (i.e., does not contain a certificate), secure processor 250 sends a message 616 indicating this status. Main processor 230 receives message 616 and reports the status of the secure storage to certificate authority 600 via a message 618.

In response to message 618, certificate authority 600 sends a certificate via a load certificate message 620. Main processor 230 then receives and forwards message 620 to secure processor 250, which loads the certificate (e.g., included in the message) to the secure storage and further sets the flag to full. Secure processor 250 then sends an acknowledgment message 624, which is received by main processor 230 and forwarded to certificate authority 600.

Figure 6B:
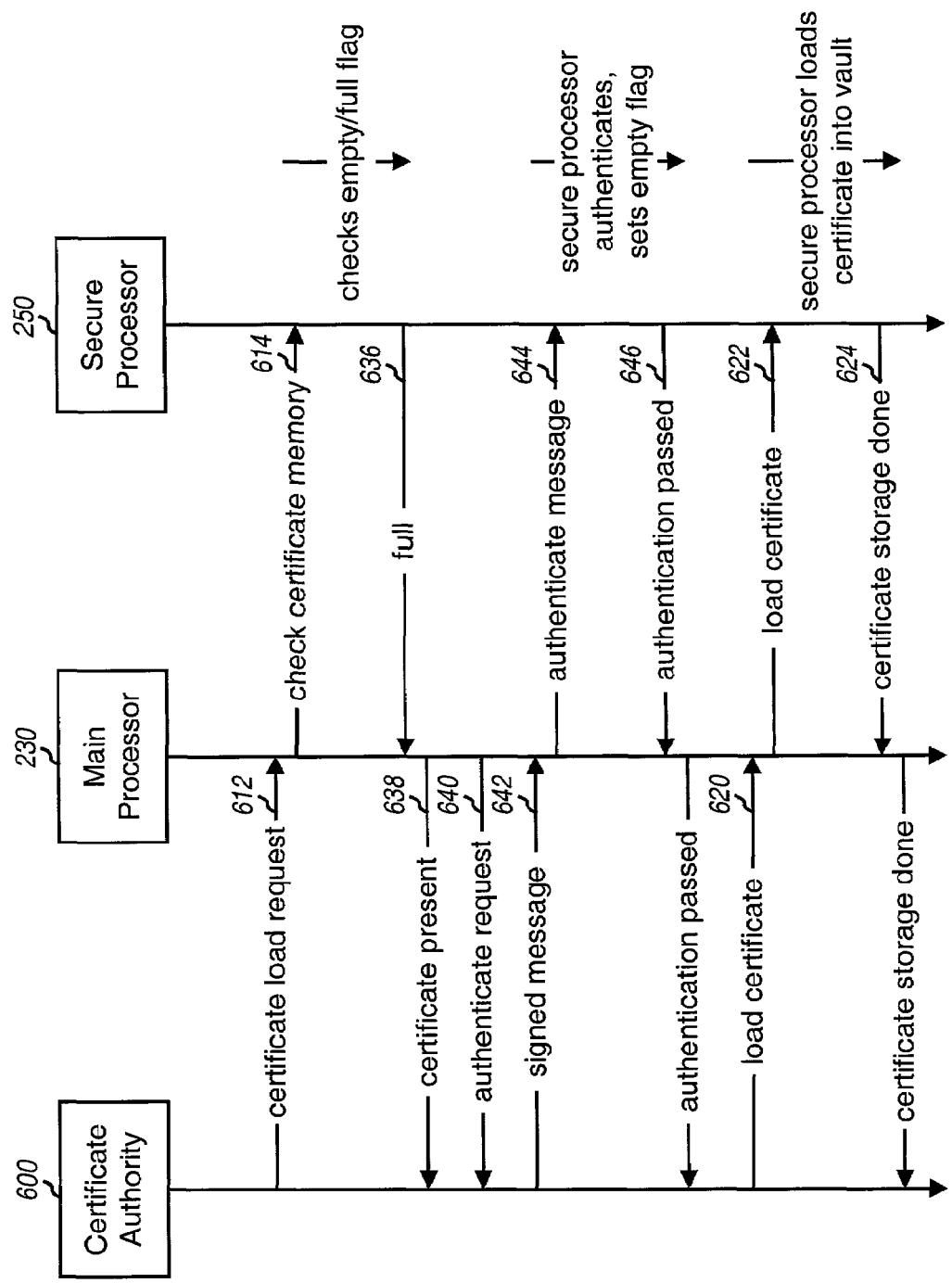

FIG. 6B is a diagram illustrating a subsequent loading of a certificate into secure unit 240, in accordance with an embodiment of the invention. A certificate may need to be updated via a subsequent certificate loading if it is determined that the user information has changed, the keys have been compromised, or for other reasons. Initially, certificate authority 600 sends a message 612 requesting a certificate load. Main processor 230 receives and processes the message and, in response, sends a request 614 to check the status of the secure storage. Secure processor 250 receives the request and determines the status of the secure storage. If the secure storage is full (i.e., already contains a certificate), secure processor 250 sends a message 636 indicating this status. Main processor 230 receives message 636 and sends to certificate authority 600 a first message 638 indicating that a certificate is already present in memory 254 and a second message 640 requesting authentication of certificate authority 600.

In response to message 640, certificate authority 600 sends a signed message 642. Main processor 230 receives and processes message 642 and sends a message 644 requesting secure processor 250 to authenticate the signed message. Secure processor 250 verifies the signed message (e.g., using the public key of certificate authority 600) and, if authenticated, sets the status of the secure storage to empty and sends an acknowledgment message 646 indicating that the authentication passed. Main processor 230 receives and forwards the acknowledgment to certificate authority 600.

In response to message 646, certificate authority 600 sends a certificate via a load certificate message 620, which is received by main processor 230 and forwarded to secure processor 250. Secure processor 250 loads the certificate to memory 254, sets the flag to full, and sends an acknowledgment message 624 back to certificate authority 600.

Figure 6C:
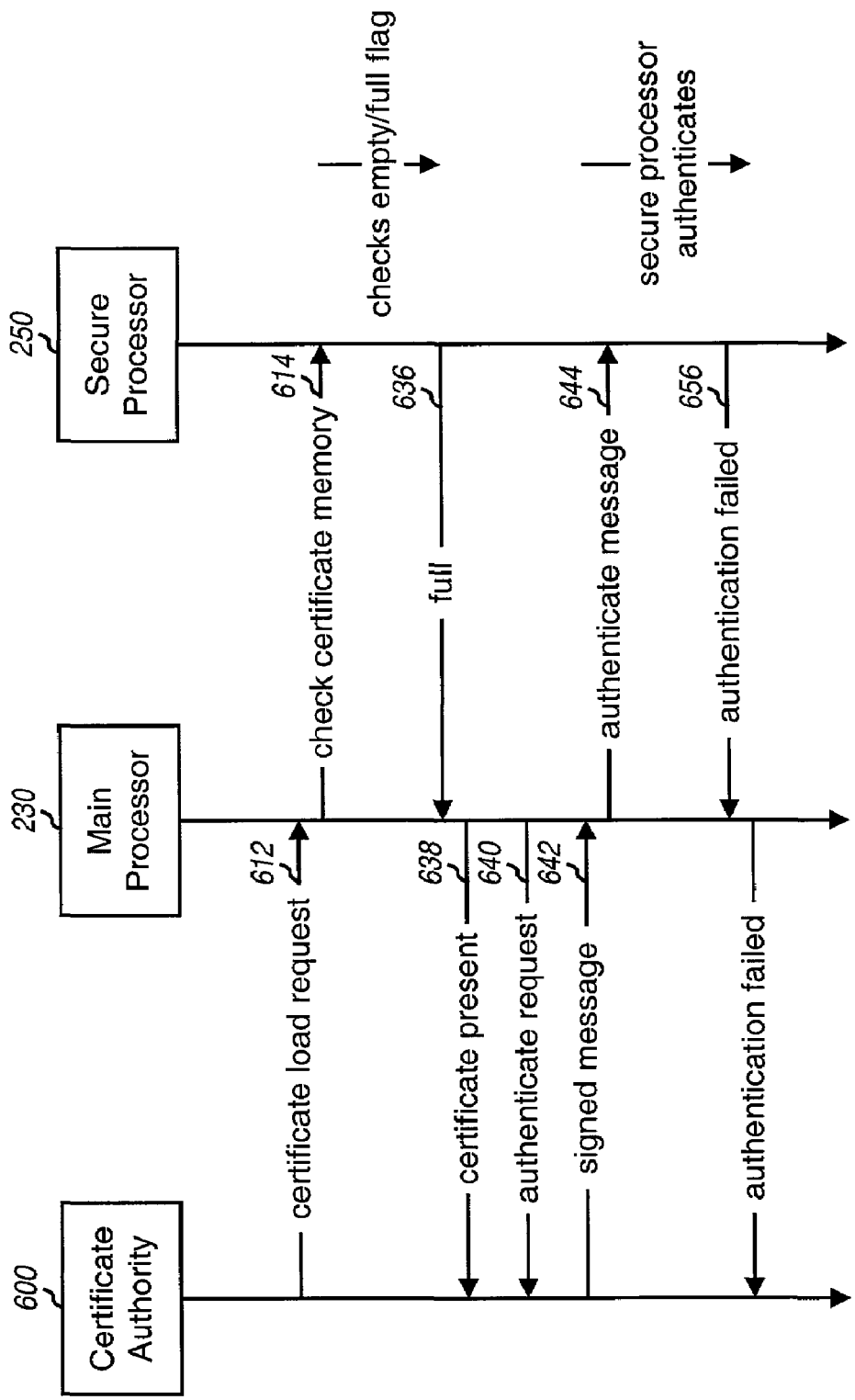

FIG. 6C is a diagram illustrating an unsuccessful attempt to load a certificate into secure unit 240. Initially, certificate authority 600 sends a certificate load request message 612. Main processor 230 receives and processes the message and, in response, sends a request 614 to check the status of the secure storage. Secure processor 250 receives the request, determines the status of the secure storage (which is full in this example), and sends a message 636 indicating this status. Since the secure storage is full, main processor 230 sends a first message 638 indicating that a certificate already exists in the secure storage and a second message 640 requesting authentication of certificate authority 600.

In response to message 640, certificate authority 600 sends a signed message 642. Main processor 230 receives and processes message 642 and sends a message 644 requesting secure processor 250 to authenticate the signed message. Secure processor 250 verifies the signed message and, if not authenticated, sends an error message 656 indicating that the authentication failed. Main processor 230 receives and forwards the error message to certificate authority 600. The error message terminates the transaction.

Secure processor 250 can be designed to perform various functions in support of the secure processing and data storage. These functions may include any combination of the following: signature generation and verification, encryption and decryption, database management, approval of updates of secure data in the secure storage, accounting, error message handling, and possibly others.

In an embodiment, the program instructions for some or all of the supported functions are stored within secure unit 240 (e.g., within ROM 252 or memory 254). This allows secure processor 250 to execute the functions based on instructions known to be reliable. This also prevents external elements (e.g., main processor 230) from spoofing secure processor 250 and maliciously accessing the secure storage. The securely stored program instructions may include those that implement hash functions, encryption, decryption, and signature algorithms, accounting functions, data management functions, and so on.

For authentication, secure processor 250 may be queried to generate and sign a message using the private key and provide the signed message to main processor 230, which then transmit the signed message to the intended recipient entity. The signature generation can be performed based on any one of the digital signature and encryption algorithms listed above. Secure processor 250 may further provide the certificate that includes the remote terminal's public key, which can be used by the recipient entity to authenticate the remote terminal.

Secure processor 250 may also be designed to authenticate each entity that requests to retrieve, load, or update the data stored in the secure storage. In general, secure processor 250 authenticates each entity desiring access to the data stored within the secure storage. The authentication may be achieved by verifying a signed message from the requesting entity (e.g., based on either the requesting entity's certificate or the requesting entity's public key, which may be included in a certificate already be stored within the secure storage). The signature verification can be performed based on the same or complementary algorithm used to generate the signature.

A message is used to generate a signature, and the signature is authenticated by a receiving entity (e.g., the remote terminal or the foreign entity). Thus, the data in the message is also verified if the signature checks. However, the message is transmitted in the clear, and no protection is provided against eavesdroppers. For many applications, it may only be important to ascertain the true identity of an entity, and authentication via digital signature is sufficient.

Encryption may be used to protect sensitive data from eavesdroppers. For encryption, secure processor 250 may be queried to encrypt data using a secrete key. The encrypted data can then be provided to main processor 230, which then transmit the encrypted data to the intended recipient entity. The secret key may be generated based on the recipient entity's private key using, for example, the Diffie-Hellman or RSA algorithm. Secure processor 250 may also be queried to decrypt encrypted data using the remote terminal's private key. The encryption and decryption of traffic may be performed based on any one of the encryption algorithms listed above (e.g., DES, IDEA, and so on). The key exchange and traffic encryption/decryption algorithms are independent of using symmetric key encryption.

For each secure transaction with secure processor 250, the foreign entity can be authenticated as described above. Once the foreign entity has been authenticated, secure processor 250 can process the received message. Depending on the transaction, data may be extracted from the received message and stored to the secure storage, or retrieved from the secure storage and provided via a signed or encrypted message. The transaction may alternatively request an update of the data within the secure storage. For example, funds stored within the secure storage may be deducted for purchases or some other transactions, or may be increased for replenishments.

Sensitive data may be securely stored and/or updated based on various schemes. In one scheme, sensitive data is stored within secure unit 240 (e.g., in memory 254 or possibly in ROM 252). With this scheme, data is verified when received, before being stored to the secure storage. For this scheme, the data may be stored in plain form (i.e., unencrypted). Subsequent data manipulations and updates of the data are performed within secure unit 240. Secure unit 240 is assured of the integrity of the data since it is stored within, and is under control of the secure unit at all times.

In another scheme, sensitive data is stored outside secure unit 240 (e.g., in system memory 236) in secure form. Again, secure unit 240 verifies the data when received from external elements (e.g., main processor 230). Prior to storage of the data, secure unit 240 may sign or encrypt the data, depending on the desired implementation, using the private key stored within the secure unit. The secured data may then be stored outside secure unit 240. For subsequent accesses, manipulations, and/or updates, the secured data may be retrieved from the external storage, verified or decrypted, and processed by secure unit 240. Secure unit 240 is assured of the integrity of the data since it is secure prior to storage and verified prior to each use.

Other schemes to store and manipulate data to ensure integrity may also be used and are within the scope of the invention.

Secure processor 250 may be designed to generate error messages for incomplete transactions (e.g., if authentication fails) or alarms in response to unauthorized attempts to access the secure data. The error messages may indicate the failure level (e.g., a warning or a fatal error), the cause for the error (e.g., unexpected message received, bad record hash, signature does not check, compression failure, handshake failure, illegal parameters, certificate errors, insufficient funds for the transaction, unauthorized accessing entity, and so on), and possibly other information.

Secure processor 250 may also be designed to support any number of security protocols such as the Secure Sockets Layer (SSL) protocol, the Transport Layer Security (TLS) protocol, and others. These protocols are known in the art and not described herein. Each protocol may establish a handshake protocol used to establish a secure communication and a messaging protocol used to establish security capabilities, exchange keys and certificates, and send secure data.

For each secure transaction, the remote terminal may act in the capacity of a server or a client. As a server, the remote terminal is requested by another entity to provide secure data. Before providing the requested data, the remote terminal typically authenticates the requesting entity. As a client, the remote terminal requests secure data from another entity and may be requested to provide information needed by the other entity to authenticate the remote terminal.

In a typical SSL transaction, the server does not authenticate the client via crypto protocols. However, the server may authenticate via other means such as credit card authorization. In an embodiment, the server authenticates the client for each secure transaction (e.g., cash register tries to take cash out of an e-wallet implemented by the secure processor). In a typical SSL transaction, the client always authenticates the server. In an embodiment, the server may authenticate the client for a secure transaction (e.g., if retrieving medical records, etc).

Figure 7:
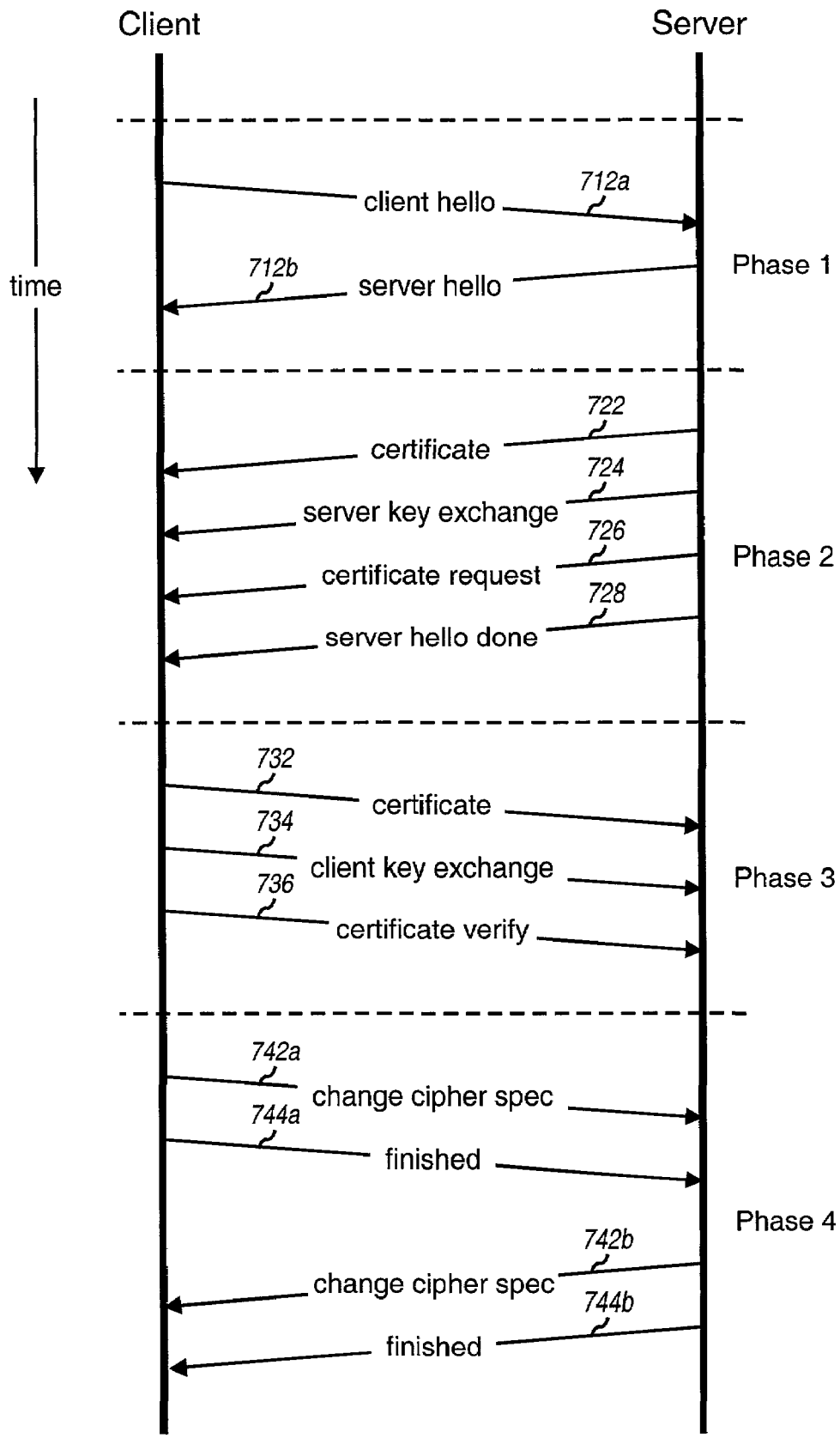
FIG. 7 is a diagram illustrating an SSL transaction between a client and a server.

FIG. 7 is a diagram illustrating a secure transaction between a client and a server. The remote terminal may be acting in either capacity for this transaction, which is partitioned into four phases. In the first phase, hello messages 712a and 712b are exchanged between the client and server to establish the secure communication. In the second phase, the server sends the server certificate, exchanges server public keys, and requests for the client certificate via messages 722, 724, and 726, respectively. The server concludes with a server hello done message 728.

In response to the server messages, the client sends the client certificate, exchanges client public keys, and requests verification of the certificate via messages 732, 734, and 736, respectively. And in the fourth phase, if the certificates have been authenticated, the client and server enable cipher suite and finishes the handshake via messages 742 and 744. Enabling cipher suite simply means to 'enable' encryption from that point forward in time. Each entity knows that from then on, the received stream will be encrypted. Data can thereafter be securely exchanged between the client and server via the exchanged keys.

Secure processor 250 and main processor 230 may each be implemented with a digital signal processor (DSP), an application specific integrated circuit (ASIC), a processor, a microprocessor, a controller, a microcontroller, a field programmable gate array (FPGA), a programmable logic device, other electronic unit, or any combination thereof designed to perform the functions described herein. The integrated circuit that implements secure processor 250 may further include other elements of remote terminal 110 such as, for example, main processor 230, TX and RX data processors 210 and 224, and so on.

Non-volatile memories (e.g., memory 254 and ROM 252) may be implemented with be a Flash memory, a programmable ROM (PROM), an erasable PROM (EPROM), an electronically erasable PROM (EEPROM), a battery backed-up RAM, some other memory technologies, or a combination thereof. Volatile memories (e.g., part of memory 236) may be implemented with a random access memory (RAM), a Flash memory, some other memory technologies, or a combination thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote terminal in a wireless communication system, comprising:
    a data processing unit configured to process data for a communication over a wireless link;
    a main processor coupled to the data processing unit and configured to provide control for the remote terminal, wherein the data processing unit and main processor are unsecured units vulnerable to being spoofed by external entities; and
    a secure unit operatively coupled to the main processor and including
        a secure processor configured to perform secure processing for the remote terminal, and
        a secure memory configured to provide secure storage of data, and
    wherein the secure unit is physically encapsulated within a secure module and further configured to prevents unauthorized accesses to the secure memory via hard-coded protocols.

2. The remote terminal of claim 1, wherein the secure unit further includes
    a read only memory (ROM) configured to store program instructions and parameters used for the secure processing.

3. The remote terminal of claim 2, wherein the ROM is embedded within the secure processor.

4. The remote terminal of claim 1, wherein the secure processor and secure memory are implemented and physically encapsulated within a single integrated circuit (IC).

5. The remote terminal of claim 1, wherein the secure processor and secure memory are physically encapsulated within a tamper resistance or tamper evident unit.

6. The remote terminal of claim 1, wherein the secure processor and secure memory are permanently affixed within the remote terminal.

7. The remote terminal of claim 1, wherein messaging and data are exchanged with the secure unit via a single entry point provided by a bus.

8. The remote terminal of claim 1, wherein the secure unit is configured to implement public-key cryptography for the secure processing.

9. The remote terminal of claim 8, wherein a private key assigned to the remote terminal is embedded within the secure processor.

10. The remote terminal of claim 9, wherein the private key is permanently etched within the secure processor.

11. The remote terminal of claim 9, wherein the private key assigned to the remote terminal is stored in a ROM within the secure processor.

12. The remote terminal of claim 1, wherein the secure processor is configurable to implement one or more security protocols.

13. The remote terminal of claim 12, wherein the one or more security protocols include Secure Sockets Layer (SSL) protocol or Transport Layer Security (TLS) protocol, or both.

14. The remote terminal of claim 1, wherein the secure unit is configurable to act in a role of a client or a server for each secure transaction with a foreign entity.

15. The remote terminal of claim 1, wherein the secure memory is configured to store electronics funds.

16. The remote terminal of claim 1, wherein the secure memory is configured to store cryptographic parameters used for the secure processing.

17. The remote terminal of claim 1, wherein the secure memory is configured to store one or more certificates used for authentication.

18. The remote terminal of claim 17, wherein a certificate is loaded into the secure memory via a secure transaction with a certificate authority.

19. The remote terminal of claim 18, wherein different levels of security is implemented for a certificate loading transaction depending on whether or not a certificate has already been loaded to the remote terminal.

20. A remote terminal in a wireless communication system, comprising:
a data processing unit configured to process data for a communication over a wireless link;
a main processor coupled to the data processing unit and configured to provide control for the remote terminal, wherein the data processing unit and main processor are unsecured units vulnerable to being spoofed by external entities; and
a secure unit embedded within the main processor and configured to perform secure processing for the remote terminal and provide secure storage of data, wherein the secure unit is further configured to implement public-key cryptography for the secure processing, and wherein the secure unit is further configured to prevents unauthorized accesses to securely stored data via hardcoded protocols.

21. A method for providing secure processing and data storage for a wireless communication device, comprising:
defining a main processor within the communication device for providing control to the remote terminal;
defining a secure processor within the communication device for performing secure processing;
defining a secure storage within the communication device for providing secure data storage;
storing program instructions and parameters used for the secure processing within the secure processor or secure storage, wherein the stored program instructions implement hardcoded protocols; and
physically encapsulating the secure processor and secure storage within a secure unit.

22. The method of claim 21, wherein the secure processor and secure storage are physically encapsulated within a single integrated circuit (IC).

23. The method of claim 21, further comprising:
permanently affixing the encapsulated secure processor and secure storage within the communication device.

24. A method for providing secure processing and data storage for a wireless communication device, comprising:
receiving a first message to initiate a secure transaction with a foreign entity;
authenticating the foreign entity through a secure processor located within the communication device; and
if the foreign entity is authenticated, performing securing processing for the secure transaction through the secure processor,
wherein the secure unit is physically encapsulated within a secure module and further configured to prevents unauthorized accesses to the secure memory via hardcoded protocols, and
providing control for the communication device through a main processor.

25. The method of claim 24, wherein the secure processing is performed based on program instructions stored within the secure processor.

26. The method of claim 24, wherein the authentication is achieved via exchanges of certificates.

* * * * *